Patented Feb. 9, 1926.

1,572,730

UNITED STATES PATENT OFFICE.

FRED M. LOCKE AND FRED J. LOCKE, OF VICTOR, NEW YORK.

BATCH FOR MAKING CERAMIC MATERIAL AND TO A CERAMIC MATERIAL MADE THEREFROM.

No Drawing.   Application filed October 17, 1924.   Serial No. 744,287.

*To all whom it may concern:*

Be it known that we, FRED M. LOCKE and FRED J. LOCKE, citizens of the United States, and residents of Victor, in the county of Ontario and State of New York, have invented certain new and useful Improvements in Batches for Making Ceramic Material and to a Ceramic Material Made Therefrom, of which the following is a specification.

The present invention relates to batches for making ceramic material and to a ceramic material made therefrom. An object of this invention is to provide in a ceramic batch, a flux which will be free, or substantially free from alkali or will have but a small alkali content, so that a body having a low coefficient of expansion and electrical insulation under heat conditions may be obtained. A further object of the invention is to provide a batch free or substantially free from alkali which has a long firing range to produce a vitrified body. Still another object of the invention is to provide a batch free or substantially free from alkali which will require relatively low heat to provide a vitrified body. A still further object of the invention is the provision of a vitrified body having very high mechanical strength and adapted to act as an electrical insulator not only for high voltage at normal temperatures, but also for high voltage at temperatures considerably above the normal. Another and still further object of the invention is the provision of a batch with a low alkali content, having a low long firing range and adapted to produce a vitrified body having very high mechanical strength and capable of acting as an electrical insulator for high voltage either at normal temperatures or at temperatures considerably above normal. By reason of these properties the articles composed of the material are exceedingly valuable when used as insulators, whether for use as high voltage line insulators, or as spark plugs which are subjected to high heat conditions, or for refractory materials, or for many other uses to which a material of this kind can be used in the ceramic art.

These and other objects will appear in the following description and will be more particularly pointed out in the appended claims.

The manufacture of porcelain, and ceramic insulating material of the porcelain type and ceramic material in general is well-known in the arts, as are also the various methods of forming into shape and firing.

In the manufacture of vitrified ceramic bodies, it has heretofore been most general to use as a flux feldspar, which makes it possible to form the body by a low long firing range. Feldspar, however, has a high alkali content and this prevents the vitrified body acting as an insulating material, particularly under high heat conditions. Furthermore, an insulator made from a batch using feldspar as a flux does not have, under ordinary conditions, high mechanical strength. Alkali earths which are low in alkali have been used to some extent as fluxes in batches for producing vitrified bodies, but these fluxes give, under ordinary conditions, a high short firing range and as a consequence the cost of manufacture of the bodies is materially increased due to the fact that extreme heat is required to reach the high firing range and the fact that the vitrifying range is very short, and if the heat is carried a little too high, the bodies will deform. For this reason, the only commercial use of alkali earths has been in connection with some other fluxing material, such, for instance, as feldspar.

We have found that manganese compounds and particularly manganese dioxide, manganese silicate and manganese oxides and other manganese compounds are exceedingly powerful fluxes when combined with aluminum compounds, as for instance, clay, and that batches using manganese compounds require as compared with other commonly used fluxes not only a smaller amount of the compound to produce the fluxing action, but they do not require so much heat to vitrify the finished product as do other fluxes; further that the finished product produced by the use of manganese compounds as a flux has superior characteristics, especially when the product is used as an electrical insulating material for high voltage under high heat conditions or atmospheric temperatures; further that the finished product has an exceedingly high mechanical strength; still further that products made with a manganese compound as a flux are much more economical to produce due to the small amount of manganese compound required, the low cost of the same, and the low heat required to produce a vitrified product; still further that between 1 and 15% of a manganese compound added to the batch produces the best results, although larger amounts can be used; and still further that manganese dioxide is in itself a conductor of electricity, yet when mixed with clays or other aluminum compounds and formed into shape and fired, such bodies are excellent insulators.

The best results have been secured by us with manganese dioxide. In making articles for insulating at temperatures above the normal as pure a grade of manganese as possible should be used free from iron and alkali, a grade of this type being known commercially as "Primoxid" brand and being manufactured by the Foote Mineral Company of Philadelphia, Pa. We have also found that the color of the product made with manganese will vary from white to a deep brown or black, depending on the amount of manganese used and the manner in which it is fired.

The batch formula will of course vary with the body to be produced. The following is an example of a batch formula which may be employed for fluxing large amounts of kaolin, or clay, especially those of the very refractory type:

| | Parts. |
|---|---|
| Delaware kaolin | 77 |
| Tennessee ball clay #5 | 15 |
| Manganese dioxide | 8 |
| | 100 |

This batch when mixed together and formed into shape, and fired to cone 10 (2426° F.) produces a vitrified body which has low expansion, good mechanical strength and upon tests by us for puncture by an electric spark at atmospheric temperatures shows that it exceeds the best porcelain and also has the quality of electrical insulation at high temperatures. For illustration, if the eight parts of manganese in this body were replaced by eight parts of feldspar or other flux, such body would not be finished at cone 10, but would require nearly cone 18 to produce vitrification, and, where feldspar is used, such a body would be useless for high temperature insulation, due to the alkali in the feldspar, and where alkaline earths are used as a flux to replace the manganese, they would produce such a short firing range that the finished product would be worthless.

An example of a batch for producing bodies having very high mechanical strength is as follows:

| | Parts. |
|---|---|
| English China clay | 40 |
| Tennessee ball clay | 10 |
| Manganese dioxide | 15 |
| Oxide of alumina (calcined) | 35 |
| | 100 |

Such a mix or batch when fired to cone 10 (2426° F.) forms a body of very high mechanical strength and also is good electrical insulator both at normal temperatures and above normal. In the above mix the alumina can, if desired, be replaced by other alumina compounds, such as alumina hydrate, or by bauxite, or other compounds high in alumina, and good results can be obtained, also other clays can be used to replace the clays given, or the manganese dioxide can be fritted or fluxed with some of the ingredients of the batch before final firing.

While we have found the best results with manganese dioxide we do not desire to be limited to the same but have found that other compounds of manganese may, if desired, be used, such as manganese silicate, etc. Also in the manufacture of refractory articles from refractory clays a small amount of manganese compound, say from 1 to 5% added to the batch will when fired bind the materials together into a superior article due to the affinity of the manganese compound for the alumina of the clay.

By the expression "relatively large amount of clay" used in the specification and claims is meant at least 35% of the batch from which the body is formed.

What we claim as our invention and desire to secure by Letters Patent is:

1. A raw batch for refractory bodies containing a relatively small amount of a compound of manganese and a relatively large amount of clay.

2. An electrical insulator comprising a vitrified body formed of a mixture of clay and a manganese compound, and having the quality of high electrical insulation under heat.

3. An electrical insulator comprising a vitrified body formed of a mixture of clay and a manganese dioxide, and having the quality of high electrical insulation under heat.

4. A raw batch for making ceramic material comprising clay, a non-plastic alumina compound, and a manganese compound.

5. A raw batch for making ceramic material containing 1 to 15% of manganese dioxide.

6. An electrical insulator comprising a vitrified ceramic body having the qualities of high mechanical strength, and high electrical insulation under heat, and formed from a mixture containing clay and a manganese compound.

7. A vitrified ceramic body having the qualities of high mechanical strength, and high electrical insulation under heat and formed from a mixture containing clay, a non-plastic alumina compound, and a manganese compound.

8. An electrical insulator comprising a vitrified ceramic body having the quality of high electrical insulation and formed from a mixture containing a relatively large amount of clay and a relatively small amount of a manganese compound.

9. A refractory body formed from a mixture of a relatively large amount of clay and a relatively small amount of a manganese compound.

10. An electrical insulator formed of a vitrified ceramic body having the quality of high electrical insulation and having a relatively small amount of a manganese compound as a component.

FRED M. LOCKE.
FRED J. LOCKE.